M. Weaver,
Sawing Shingles.
N°40,969. Patented Dec. 15, 1863.
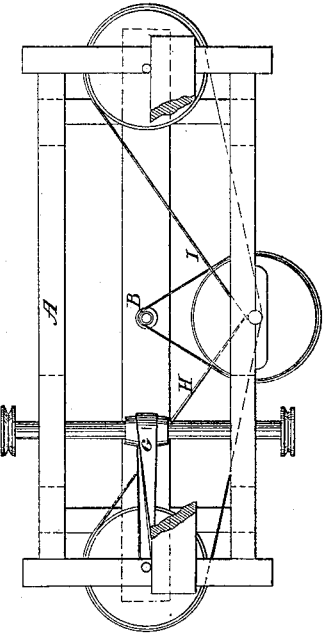
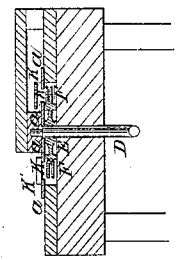
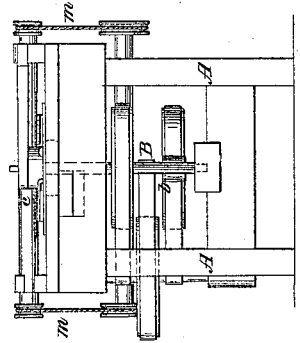
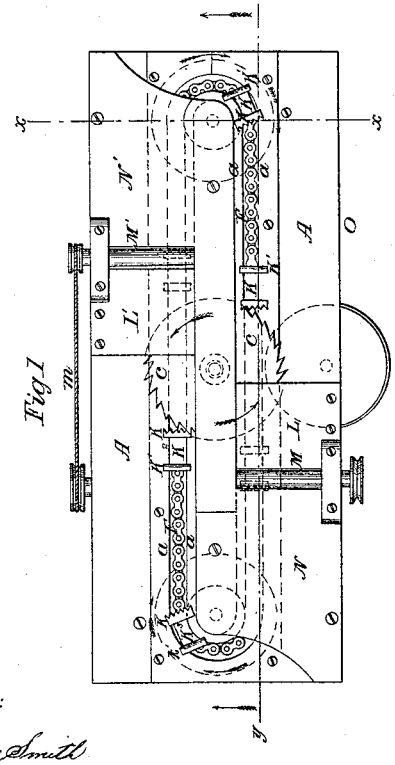
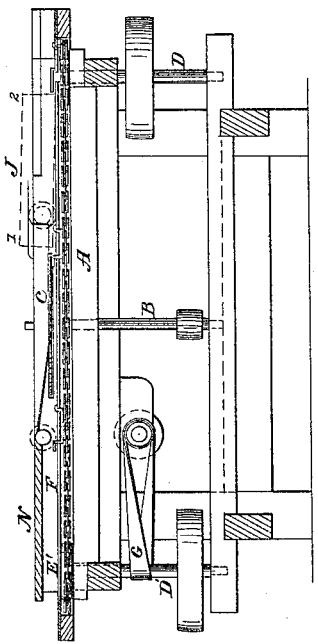
Witnesses:
Charles Smith
Inventor:
M. Weaver
By Munn & Co.
Attys

UNITED STATES PATENT OFFICE.

MARTIN WEAVER, OF MILLERSBURG, PENNSYLVANIA.

IMPROVED SHINGLE-MACHINE.

Specification forming part of Letters Patent No. 40,969, dated December 5, 1863; antedated December 1, 1863.

*To all whom it may concern:*

Be it known that I, MARTIN WEAVER, of Millersburg, in the county of Dauphin and State of Pennsylvania, have invented a new and Improved Shingle-Machine; and I do hereby declare the following to be a full and exact description of the same, reference being had to the accompanying drawings, making part of this specification, in which—

Figure 1 is a plan or top view of my said machine. Fig. 2 is a vertical longitudinal section of the same at $x\,x$, Fig. 1. Fig. 3 is an end view thereof. Fig. 4 is a plan of the lower part of the machine, with the upper working parts and the table removed. Fig. 5 is a vertical section at $y\,y$, Fig. 1, on a larger scale, of a portion of the machine.

Similar letters of reference indicate corresponding parts in the several views.

The subject of my invention is a machine provided with a horizontal circular saw and an endless chain carrying the bolts to the two sides of the saw, alternately, as will be hereinafter explained.

In order that others skilled in the art to which my invention appertains may be enabled to fully understand and use the same, I will proceed to describe its construction and operation.

A A represent various parts of a main frame, in the center of which is journaled a vertical shaft, B, to the upper end of which shaft a horizontal circular saw, C, is attached. The shaft B is rotated at a high velocity by a band upon the pulley $b$.

D D' are two vertical shafts, mounted near the respective ends of the machine, and each carrying near its upper end a sprocket-wheel, E E', around which sprocket-wheels an endless chain, F, is stretched. The shafts E E' receive corresponding rotation in the same direction, and at low speed, by means of bands G H I, which may be arranged as represented, or in any other suitable manner.

K K' K² K³ are toothed gage-blocks or forms, which may be constructed of metal and are attached equidistantly around the endless chain F, at distances apart corresponding with the length of a shingle-block. The said gage-blocks are formed in front with teeth $k$ to engage with the rear end of the block, and at back with a rib, $k'$, on which the forward end of the block may rest, as represented in Fig. 2, where the block is represented in red at J. The traveling gages K $k\,k'$ are fitted to work in or upon guides $a\,a$, as shown in Fig. 5, which hold them in accurately horizontal positions and cause them to pass at the required distance under the saw to impart the required thickness and taper to the shingles, as hereinafter explained.

L L represent plates partly covering the saw in positions to receive the shingle block after the separation of the shingle.

M M' are rollers by which the shingle-blocks are taken from the plates L L', and depositing them on tables N N'. The rollers M M' may be driven by belts $m\,m$.

Operation: The blue arrows indicate the directions in which the various parts move. An operator is stationed at O and one at O', and the work proceeds as follows: The operator at O reaches the block which is upon the table N' and, without turning it over or around, draws it off the said table, depositing the end 1 upon the rib $k'$ of the gage-block K, and the end 2 upon the guides $a\,a$, directly in front of the teeth $k$ of the gage-block K'. The continuous motion of the chain F will then cause the gage-block K' to catch the shingle-block and carry it forward against the edge of the saw. A shingle will thus be separated from the block and will pass beneath the saw, while the remainder of the block passes above the saw onto the plate L, when it is caught by the roller M, and by it carried onto the table N. The block is then taken by the operator at O', who draws it across to the other side of the machine, resting the end 2 upon the rib $k'$ of the gage-block K² and the end 1 upon the guides $a\,a$ in front of the gage-block K³, ready to be caught by the teeth $k$ thereof. It will thus be apparent that each shingle cut from the block is tapered to an extent equal to the height of the rib $k$, above the top of the guides; and further, that as the block is at each succeeding operation carried back in an opposite direction without its own position being changed, or, in other words, that as its position in respect to the endless chain F and block K, &c., is changed at every operation, the taper of the shingle-block will be reversed each time, and by this means the block will be worked up evenly to the end. The cutting action being performed simultaneously on opposite sides of the saw causes it to work with steadiness and relieves the arbor from lateral strain and undue friction.

The endless chain F possesses great advantage over a band for carrying the forms K K', inasmuch as the latter may be attached to its upper surface, and the chain revolved continuously in one plane, instead of requiring to be deflected into alternately horizontal and vertical positions, or necessitating the attachment of the gage-blocks to a vertical surface, as in the case of a band.

Having thus described my invention, what I claim as new therein, and desire to secure by Letters Patent, is—

1. The combination of the horizontal circular saw C, adapted to cut on both sides of the horizontal endless chain F, and gage-blocks K, all arranged and operating as herein set forth.

2. The combination of the tables N N' with the rollers M M', endless chain F, gage-blocks K K', and double-acting saw C, all constructed and operating as described.

The above specification of my improvement in shingle-machines signed this 25th day of February, 1863.

MARTIN WEAVER.

Witnesses:
OCTAVIUS KNIGHT,
CHARLES SMITH.